US009857672B2

(12) United States Patent
Takahashi et al.

(10) Patent No.: US 9,857,672 B2
(45) Date of Patent: Jan. 2, 2018

(54) LIGHT SOURCE UNIT, LIGHTING APPARATUS AND IMAGE PROJECTION APPARATUS

(71) Applicants: Tatsuya Takahashi, Tokyo (JP); Takanobu Osaka, Kanagawa (JP); Naoki Nakamura, Saitama (JP); Kazuhiro Fujita, Tokyo (JP); Takehiro Nishimori, Kanagawa (JP)

(72) Inventors: Tatsuya Takahashi, Tokyo (JP); Takanobu Osaka, Kanagawa (JP); Naoki Nakamura, Saitama (JP); Kazuhiro Fujita, Tokyo (JP); Takehiro Nishimori, Kanagawa (JP)

(73) Assignee: RICOH COMPANY, LTD, Tokyo (JP)

( * ) Notice: Subject to any disclaimer, the term of this patent is extended or adjusted under 35 U.S.C. 154(b) by 47 days.

(21) Appl. No.: 14/202,422

(22) Filed: Mar. 10, 2014

(65) Prior Publication Data

US 2014/0268068 A1 Sep. 18, 2014

(30) Foreign Application Priority Data

Mar. 14, 2013 (JP) ................................. 2013-052023
Feb. 28, 2014 (JP) ................................. 2014-038813

(51) Int. Cl.
*G03B 21/20* (2006.01)
*F21V 13/02* (2006.01)
(Continued)

(52) U.S. Cl.
CPC .......... *G03B 21/2066* (2013.01); *F21V 13/02* (2013.01); *F21V 13/04* (2013.01);
(Continued)

(58) Field of Classification Search
CPC ........ F21V 7/0025; F21V 14/04; F21V 13/08; F21V 13/04; F21V 7/0033; F21V 7/0083;
(Continued)

(56) References Cited

U.S. PATENT DOCUMENTS 7,390,097 B2 6/2008 Magarill
2002/0114158 A1* 8/2002 Chuang ......................... 362/243
(Continued)

FOREIGN PATENT DOCUMENTS

CN 1617044 A 5/2005
CN 102591120 A 7/2012
(Continued)

OTHER PUBLICATIONS

Chinese Office Action dated Nov. 4, 2015.
U.S. Appl. No. 14/189,142, filed Feb. 25, 2014.

*Primary Examiner* — Christina Riddle
*Assistant Examiner* — Christopher Lamb, II
(74) *Attorney, Agent, or Firm* — Harness, Dickey & Pierce, P.L.C.

(57) ABSTRACT

A light source unit includes a first reflector having a reflection face; a second reflector having a reflection face; a plurality of light sources; and a light condensing optical system to condense light emitted from the plurality of light sources. Light beams emitted from the plurality of light sources are reflected at a first reflection position on the reflection face of the first reflector, and then reflected at a second reflection position on the reflection face of the second reflector. The second reflection position is close to an optical axis of the light condensing optical system compared to the first reflection position.

17 Claims, 15 Drawing Sheets

(51) Int. Cl.
*F21V 13/04* (2006.01)
*G03B 33/06* (2006.01)
*H04N 9/31* (2006.01)

(52) U.S. Cl.
CPC ......... *G03B 21/204* (2013.01); *G03B 21/208* (2013.01); *G03B 21/2013* (2013.01); *G03B 33/06* (2013.01); *H04N 9/3164* (2013.01)

(58) Field of Classification Search
CPC ............ G03B 21/2066; G03B 21/2013; G03B 21/2006; G03B 21/2033; H04N 9/3164; G02B 6/0011; G02B 6/0001; F21S 10/005
USPC ............................ 353/37; 362/243, 245, 235
See application file for complete search history.

(56) References Cited

U.S. PATENT DOCUMENTS

| | | | |
|---|---|---|---|
| 2005/0062937 A1* | 3/2005 | Imade et al. .................... 353/31 |
| 2006/0039140 A1* | 2/2006 | Magarill ............ G02B 27/0905 362/227 |
| 2008/0239697 A1* | 10/2008 | Katsuda .................. A61B 1/24 362/33 |
| 2009/0190347 A1 | 7/2009 | Lanz |
| 2010/0020538 A1 | 1/2010 | Schulz et al. |
| 2012/0019791 A1 | 1/2012 | Abe et al. |
| 2012/0092628 A1 | 4/2012 | Takahashi et al. |
| 2012/0147333 A1* | 6/2012 | Jorgensen ....................... 353/31 |
| 2012/0212929 A1* | 8/2012 | Li ...................... G03B 21/2033 362/19 |
| 2012/0236266 A1 | 9/2012 | Takahashi et al. |
| 2012/0300178 A1* | 11/2012 | Sugiyama et al. ............. 353/31 |
| 2012/0320355 A1 | 12/2012 | Maeda |
| 2013/0010264 A1 | 1/2013 | Takahashi et al. |
| 2013/0021582 A1 | 1/2013 | Fujita et al. |
| 2013/0070333 A1 | 3/2013 | Takahashi et al. |
| 2013/0308104 A1* | 11/2013 | Nishimori et al. ............. 353/37 |
| 2013/0321777 A1* | 12/2013 | Wang ...................... F21V 13/08 353/31 |
| 2014/0028983 A1* | 1/2014 | Fujita et al. .................... 353/30 |
| 2015/0176810 A1* | 6/2015 | Mitchell et al. .............. 362/293 |

FOREIGN PATENT DOCUMENTS

| | | |
|---|---|---|
| CN | 102722027 A | 10/2012 |
| CN | 102841494 A | 12/2012 |
| EP | 1471746 A2 | 10/2004 |
| JP | 2002270005 A | 9/2002 |
| JP | 2005031589 A | 2/2005 |
| JP | 2011-013317 | 1/2011 |
| JP | 2011-076781 | 4/2011 |
| JP | 2011-107723 | 6/2011 |
| JP | 2012118302 A | 6/2012 |
| WO | WO-2006/027621 A2 | 3/2006 |

\* cited by examiner

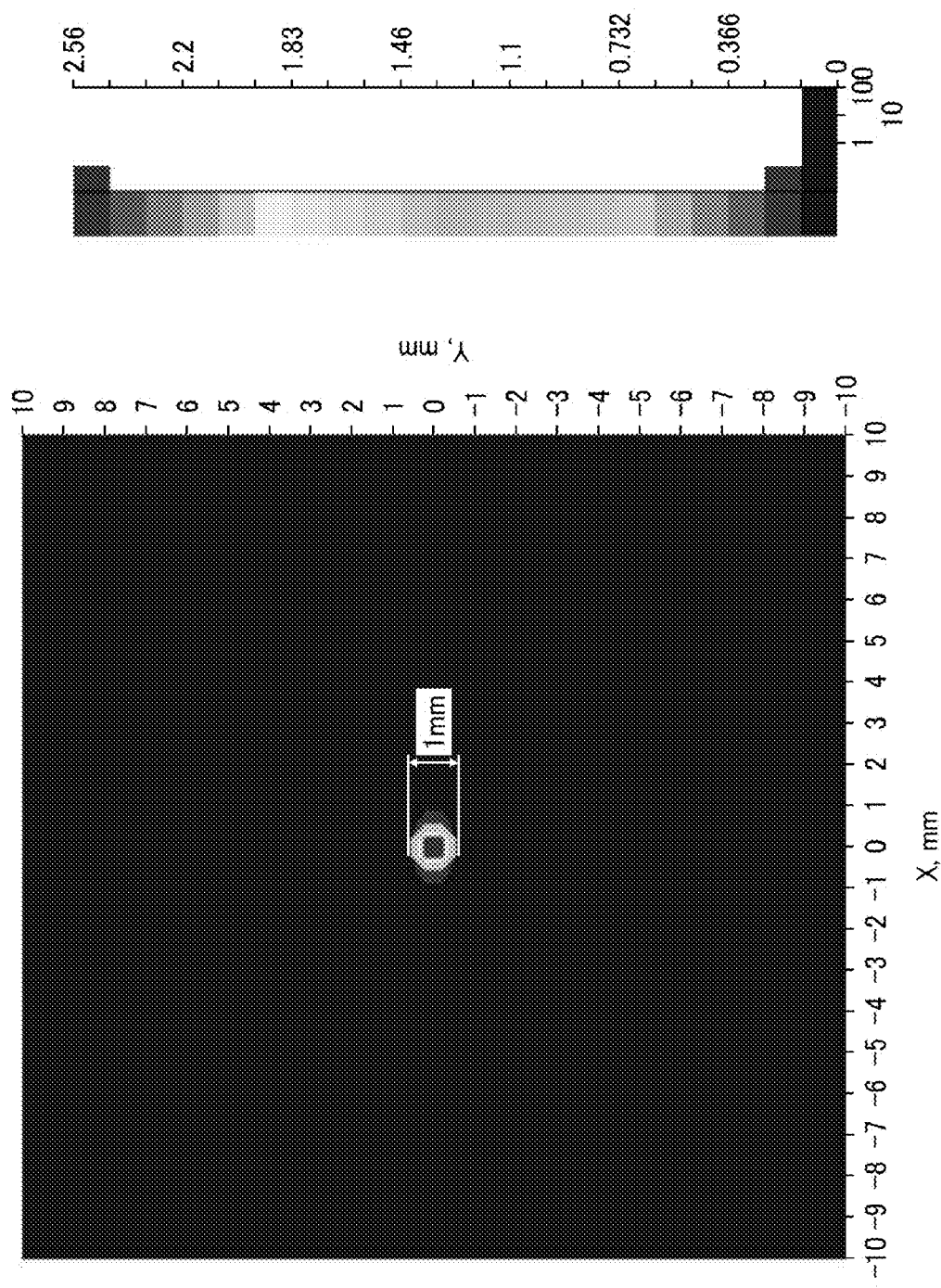

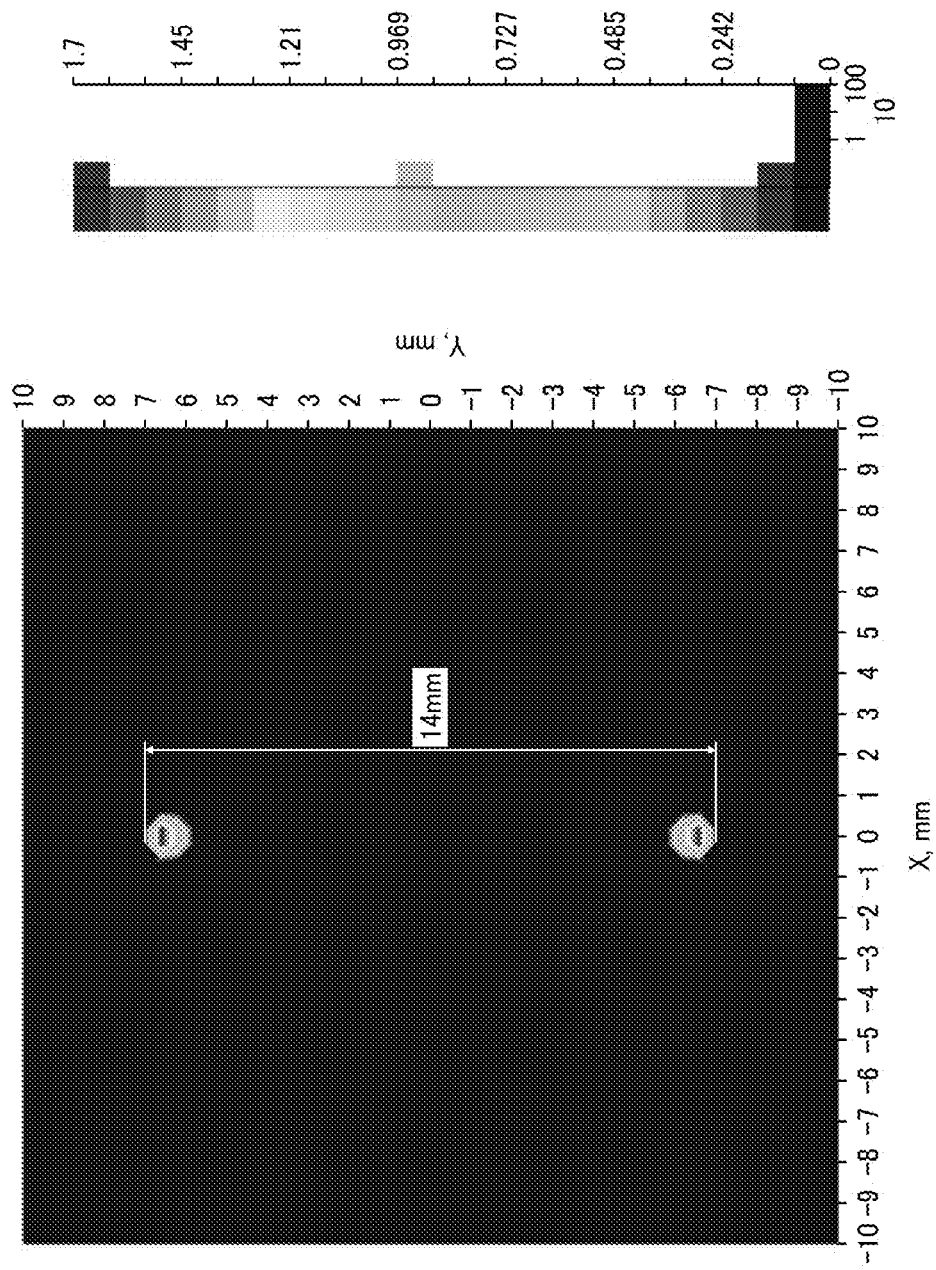

LIGHT SOURCE UNIT, LIGHTING APPARATUS AND IMAGE PROJECTION APPARATUS

This application claims priority pursuant to 35 U.S.C. §119 to Japanese Patent Application Nos. 2013-052023, filed on Mar. 14, 2013 and 2014-038813, filed on Feb. 28, 2014 in the Japan Patent Office, the disclosures of which are incorporated by reference herein in their entirety.

BACKGROUND

Technical Field

The present invention relates to a light source unit having a plurality of light sources, a lighting apparatus having the light source unit, and an image projection apparatus employing the lighting apparatus.

Background Art

Screen images of personal computers, video images, and image data stored in memory cards can be transmitted to image projection apparatuses known as projectors that can project images onto a screen. Theses image projection apparatuses include a lighting unit using a high-intensity discharge lamp (e.g., super high-pressure mercury lamp) as light source. The discharge lamp can emit high-intensity light with low cost, but needs a given time to stably emit light after turning ON the lamp. In view of such issues of the discharge lamp, as alternative light source of the discharge lamp, a solid light emitting element such as a light emitting diode (LED), a laser diode (LD) of red (R), green (G), and blue (B), or organic electroluminescence (OEL) have been developed as the light source.

By using the solid light emitting element as the light source of projectors, high-speed activation of projectors can be devised, and environmental burden can be reduced. The light source unit using the solid light emitting element may include, for example, a first light source (excitation light source) such as a blue laser diode and fluorescent material, in which a laser beam emitted from the blue laser diode as a excitation light is irradiated to the fluorescent material, with which the fluorescent material is excited to generate light of R, G, B, and the R, G, B light is modulated for gradation for each pixel using a light modulation element such as a digital micro-mirror device (DMD) to generate a color projection image.

In the image projection apparatuses using the laser diode as the light source, how to secure light quantity becomes an important issue, and it has been proposed to arrange a large number of laser diodes in a matrix pattern on a plane or to arrange a large number of laser diodes densely two-dimensionally.

For example, one configuration is disclosed for synthesizing light emitted from a plurality of light sources arranged on a plane with rows and columns, in which a plurality of rectangular reflection mirrors is arranged in a step-like pattern to shorten an interval between light flux emitted from light source in each row, and to shorten an interval between light flux emitted from light source in each column.

If a large number of light sources (e.g. laser diodes) are arranged as laser sources, light emitted from each light source (e.g. laser diode) is required to be focused at a substantially one point in view of compact size of a light-transmission optical system and higher light efficiency.

If a distance from the laser sources (light sources) to a light focus point is set small, a light entering angle at the light focus point becomes greater, and light use efficiency at later optical parts becomes lower and a size of optical system becomes greater.

By contrast, if a distance from the laser sources (light sources) to a light focus point is set great, fluctuation of the light focus point becomes greater due to tolerance of laser, light emitting point and optical system, with which efficient use of light emitted from the light source at later optical parts becomes difficult. This could be solved by increasing a lens diameter, but a greater lens increases the size of optical system In the above configuration, a cross-section area of light flux is reduced by synthesizing light beams using the reflection mirrors. Because a plurality of reflection mirrors are used to synthesize light beams, setting and adjustment of each mirror is required, and a space for arranging a plurality of reflection mirrors in the step-like pattern is required, with which a compacting of size of light source unit becomes difficult.

SUMMARY

In one aspect of the present invention, a light source unit is devised. The light source unit includes a first reflector having a reflection face; a second reflector having a reflection face; a plurality of light sources; and a light condensing optical system to condense light emitted from the plurality of light sources. Light beams emitted from the plurality of light sources are reflected at a first reflection position on the reflection face of the first reflector, and then reflected at a second reflection position on the reflection face of the second reflector. The second reflection position is close to an optical axis of the light condensing optical system compared to the first reflection position.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10A shows a condition of light focus point for the light source unit of FIG. 4;

FIG. 10B shows a condition of light focus point for the light source unit of FIG. 7;

Figure 1:
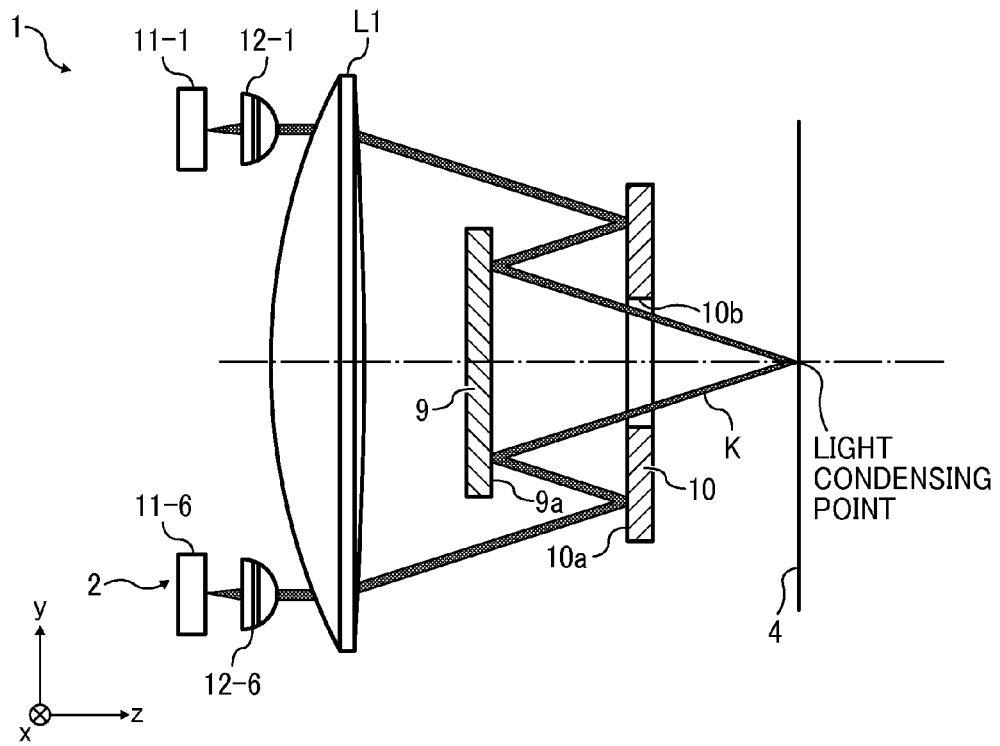
FIG. 1 is a schematic side view of a light source unit according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter.

(First Example Embodiment)

Figure 2:
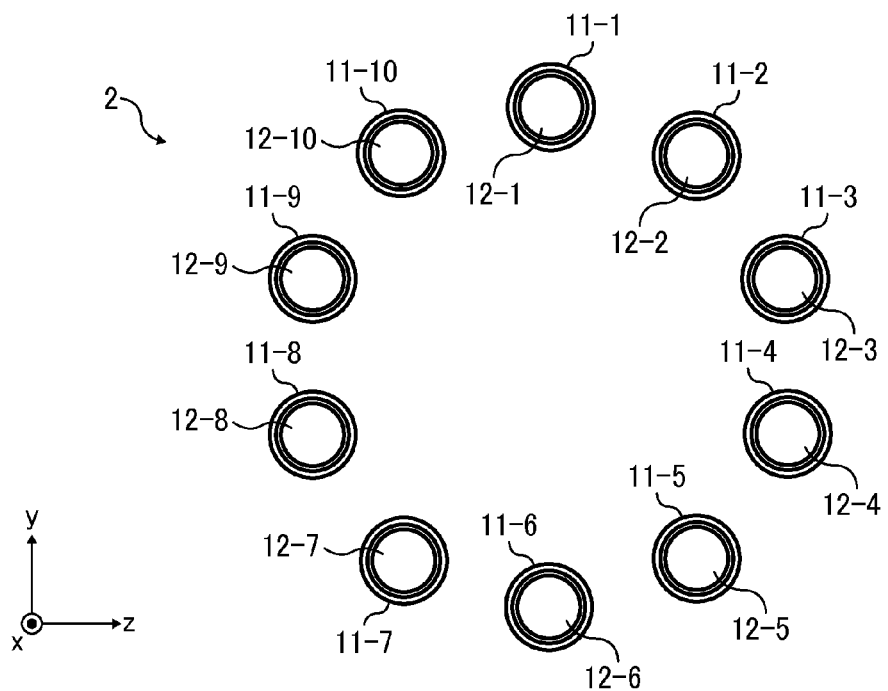
FIG. 2 is a schematic front view of a light source assembly of the light source unit of FIG. 1.

FIG. 1 is a schematic side view of a light source unit 1 according to a first example embodiment, and FIG. 2 is a schematic front view of light sources included in the light source unit 1. For the simplicity of the drawing, FIG. 1 shows a configuration of disposing two light sources, but the light source unit 1 can be disposed with a plurality of light sources as shown in FIG. 2 such as ten light sources. Further, FIG. 2 shows a configuration of light sources and coupling lenses.

The light source unit 1 includes, for example, a light source assembly 2, a condensing lens L1, a first reflection mirror 10 and a second reflection mirror 9. The light source assembly 2 includes a plurality of light sources 11-1 to 11-10 and a plurality of coupling lenses 12-1 to 12-10 arranged in a circle pattern two dimensionally. The condensing lens L1 is used as a light condensing optical system to generate converging light from light beams emitted from each one of light sources in the light source assembly 2, in which the converging light is generated while reducing a cross-section area of light beams towards the center of circle. The first reflection mirror 10 is used as a first reflector, and the second reflection mirror 9 is used as a second reflector. The plurality of light sources 11-1 to 11-10 and the plurality of coupling lenses 12-1 to 12-10 are disposed with a concentric circular pattern (FIG. 2) about an optical axis of the condensing lens L1 (long-dashed/short-dashed line in FIG. 1).

Compared to the second reflection mirror 9, the condensing lens L1 is disposed at a position closer to the light sources 11-1 to 11-10. Specifically, as shown in FIG. 1, the plurality of light sources 11-1 to 11-10, the plurality of coupling lenses 12-1 to 12-10, the condensing lens L1, the second reflection mirror 9, and the first reflection mirror 10 are arranged in this order from the left (or light source side) to the right (light exit side) in the light source unit 1.

Each of the plurality of light sources 11-1 to 11-10 is, for example, a semiconductor laser such as a laser diode, and color of each light emitted from the light source assembly 2 may be the same color, or different color with each other. Each of the plurality of coupling lenses 12-1 to 12-10 is a convex lens made of glass or plastic. The light sources 11-1 to 11-10 and the respective coupling lenses 12-1 to 12-10 are being faced each other so that the optical axis of the light sources 11-1 to 11-10 and a curvature center axis of the respective coupling lenses 12-1 to 12-10 are aligned with each other. Each of the coupling lenses 12-1 to 12-10 includes a collimator lens that converts a light emitting from the light source to parallel light or converging light.

By arranging the light sources 11-1 to 11-10 and the coupling lenses 12-1 to 12-10 in the above described configuration, light emitted from each one of the light sources 11-1 to 11-10 passes through the respective coupling lenses 12-1 to 12-10, facing the respective light sources 11-1 to 11-10, and then enters the condensing lens L1.

Then, by using a single condensing lens such as the condensing lens L1 facing the coupling lenses 12-1 to 12-10, a substantially conically-shaped light slanted toward the center of the circle with respect to the first reflection mirror 10 is generated. Because the light source assembly 2 is configured with a combination of the light sources 11-1 to 11-10 and the coupling lenses 12-1 to 12-10 that can convert light emitted from the light sources 11-1 to 11-10 to parallel light or converging light, even if light emitted from the light sources 11-1 to 11-10 is diverging light, the light emitted from the light sources can be efficiently used by passing the light through the coupling lenses 12-1 to 12-10.

Figure 3A:
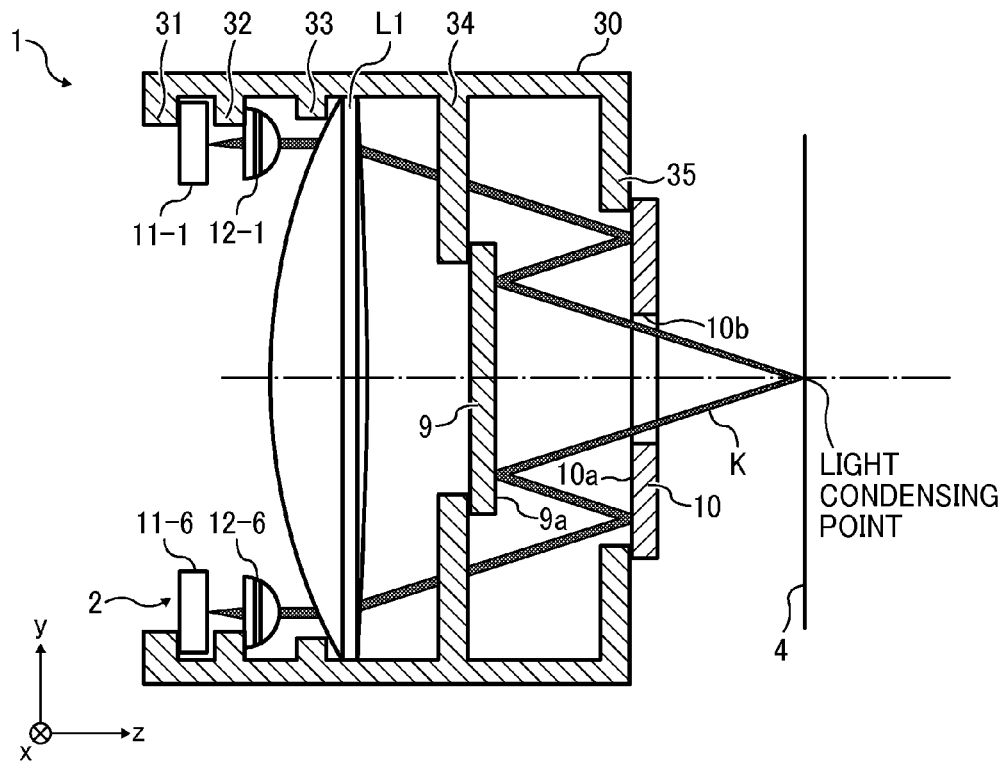
FIG. 3A is a schematic side view of a light source unit with a holding structure according the first example embodiment.

As shown in FIG. 3A, the first reflection mirror 10 has a reflection face 10a, and the second reflection mirror 9 has a reflection face 9a, and the first reflection mirror 10 and the second reflection mirror 9 are arranged to face the reflection face 10a and the reflection face 9a with each other. In an example embodiment, each of the first reflection mirror 10 and the second reflection mirror 9 is a single reflection mirror.

Figure 3B:
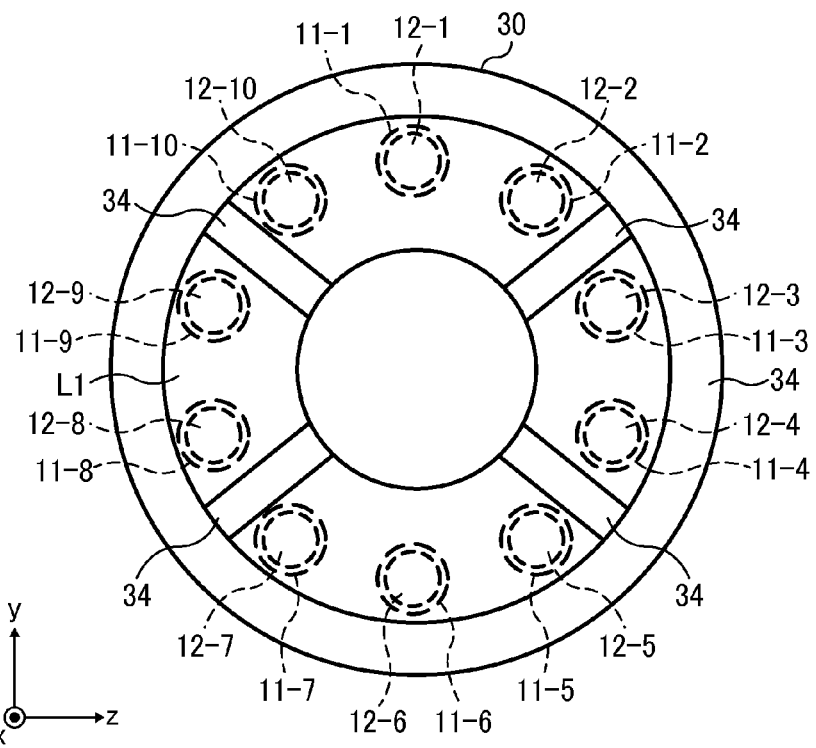
FIG. 3B is a schematic front view of the light source unit of FIG. 3A.

As shown in FIG. 3A, the light sources 11-1 to 11-10, the coupling lenses 12-1 to 12-10, the condensing lens L1, the second reflection mirror 9 and the first reflection mirror 10 are supported by a supporter 30 using retaining parts 31, 32, 33, 34, 35 formed for the supporter 30. FIG. 3B is a front view of FIG. 3A. In FIG. 3B, the first reflection mirror 10 is omitted for the clarity of drawing.

The supporter 30 can be made of, for example, metal such as aluminum and molding resin, and the supporter 30 can be formed with the retaining parts 31 to 35 integrally, or the supporter 30 and the retaining parts 31 to 35 can be formed separately and then bonded together as an integral part.

The first reflection mirror 10 is made from a parallel plate such as a glass plate. A reflection face 10a, used as a reflection mirror, can be formed on one face of the first reflection mirror 10 by depositing silver film or dielectric multilayer such as aluminum layer on one face of the first reflection mirror 10. The first reflection mirror 10 is retained in the supporter 30 by the retaining part 35.

The first reflection mirror 10 includes a light passing portion for passing light beams. The light passing portion may, for example, be an opening part 10b set at the center portion of the first reflection mirror 10, wherein the opening part 10b is formed, for example, as a through hole. Alternatively, the light passing portion can be formed without forming an opening such as a through hole. For example, the light passing portion can be formed by depositing an aluminum layer on a glass plate while not depositing aluminum at a position corresponding to the opening part 10b, which means that the aluminum layer is formed with a ring pattern on the glass plate, and the center portion of the ring pattern not formed with the aluminum layer can be used as a transparent portion that can be used as an alternative of the opening part 10b, in which processing cost for a through hole can be saved. As above described, the light passing portion can be formed on the transparent plate, or can be formed as a through hole that the light can pass through, in which the transparent plate does not exist at the light passing portion.

The second reflection mirror 9 is made from a parallel plate such as a glass plate. The reflection face 9a, used as a reflection mirror, can be formed on one face of the second reflection mirror 9 by depositing silver film or dielectric multilayer such as aluminum layer on one face of the second reflection mirror 9. The second reflection mirror 9 is retained in the supporter 30 by the retaining part 34 while the retaining part 34 retains a non-reflection side of the second reflection mirror 9 without blocking the light path of light. By using one single first reflection mirror 10 and one single second reflection minor 9, positional adjustment of light focus point can be conducted easily compared to a configuration providing a reflection mirror for each one of the light sources.

The light beams emitted from the light sources 11-1 to 11-10 of the light source assembly 2 efficiently enter the respective coupling lenses 12-1 to 12-10 and become substantially parallel light or substantially condensed light and then the light beam pass through the condensing lens L1.

The light beam passing through the condensing lens L1 is reflected by the reflection face 10a of the first reflection mirror 10 toward the coupling lenses 12-1 to 12-10, and enters the second reflection mirror 9 disposed at a position closer to the light source assembly 2 compared to a position of the first reflection mirror 10 as shown in FIG. 1. Then, the light beam is further reflected at the reflection face 9a of the second reflection mirror 9 toward the first reflection mirror 10, and guided to the reflection face 10a of the first reflection mirror 10.

In this case, the number of light reflection times between the first reflection mirror 10 and the second reflection mirror 9 is set to one time, and after such reflection, the light exits from the opening part 10b of the first reflection mirror 10, which is used as a light passing portion. If the number of light reflection times between the first reflection mirror 10 and the second reflection mirror 9 is set to a plurality of times, the light is repeatedly reflected between the reflection face 10a of the first reflection mirror 10 and the reflection face 9a of the second reflection mirror 9 for the plurality of times, and then the light exits from the opening part 10b of the first reflection mirror 10.

In the above configuration, the light emitted from each of the light sources 11-1 to 11-10 enters the condensing lens L1 and is refracted by the condensing lens L1, and then exits the condensing lens L1 toward the reflection face 10a of the first reflection mirror 10, and then enters the reflection face 10a. The light that has entered the reflection face 10a is reflected by the reflection face 10a toward the second reflection mirror 9, and then reflected by the reflection face 9a of the second reflection mirror 9 toward the first reflection mirror 10 (first reflector), and then enters the first reflection mirror 10. Then, the light reflected to the first reflection mirror 10 (first reflector) from the reflection face 9a of the second reflection mirror 9 (second reflector) exits from the opening part 10b of the first reflection mirror 10 as shown in FIG. 3A.

In the above described configuration, the light emitted from the light sources 11-1 to 11-10 becomes closer about the optical axis of the condensing lens L1 at a reflection position on the reflection face 9a of the second reflection mirror 9 (second reflector) compared to a reflection position on the reflection face 10a of the first reflection mirror 10 (first reflector). In the first example embodiment, the number of light reflection times by each of the first reflection mirror 10 and the second reflection mirror 9 is set to one time.

As above described, the light beams emitted from the plurality of light sources 11-1 to 11-10 reflect for a given number of times, for example, one time or a plurality of times between the first reflection mirror 10 and the second reflection mirror 9, with which a distance for synthesizing light beams emitted from the light sources 11-1 to 11-10 can become shorter, and the light source unit 1 can be compact in size. The synthesized light beams can become a light beam flux K while reducing its cross-section area, by which the light density of the light beam flux K can be increased, with which the light beam flux K having high light intensity can be emitted.

Further, in the first example embodiment, light beams emitted from the light sources 11-1 to 11-10 enter the condensing lens L1 collectively even if an attachment position of each of the light sources 11-1 to 11-10 and the coupling lenses 12-1 to 12-10 have fluctuation due to tolerance, with which fluctuation of the light focus point can be suppressed, in which an adjustment mechanism for each of the light sources and coupling lens is not required, and adjustment process can be simplified and the cost of light source unit can be reduced. Therefore, an adjustment mechanism for each of the light sources and coupling lenses is not required, and adjustment process can be simplified and the cost of light source unit can be reduced.

Further, light beams emitted from the light sources 11-1 to 11-10 enter the condensing lens L1 obliquely and become closer to the center part of the first reflection mirror 10 when passing through the condensing lens L1 due to the refraction effect of the condensing lens L1, with which the light beams can be synthesized with a shorter distance.

In a configuration of FIG. 3, the number of light reflection times at the first reflection mirror 10 and the second reflection mirror 9 is set to one time.

Further, the number of light reflection times at the first reflection mirror 10 and the second reflection mirror 9 can be set to a plurality of times by adjusting a focal distance of the condensing lens L1. In this configuration, the light emitted from the light sources 11-1 to 11-10 is condensed and refracted by the condensing lens L1, and then the light is repeatedly reflected between the reflection face of the first reflection mirror 10 and the reflection face of the second reflection mirror 9, and then the light exits from the light passing portion formed at the center portion of the first reflection mirror 10. If the light is repeatedly reflected between the first reflection mirror 10 and the second reflection mirror 9 for a plurality of times, a distance for synthesizing the light beams emitted from the light sources 11-1 to 11-10 can be shortened. Further, compared to a cross-section area of light flux K corresponding to the one time reflection of light, a cross-section area of light flux K corresponding to the plurality of reflection times can be reduced, with which the density of light flux K can be increased, and light flux having high luminance can be emitted, and further the size of light source unit or apparatus can be reduced.

Figure 4:
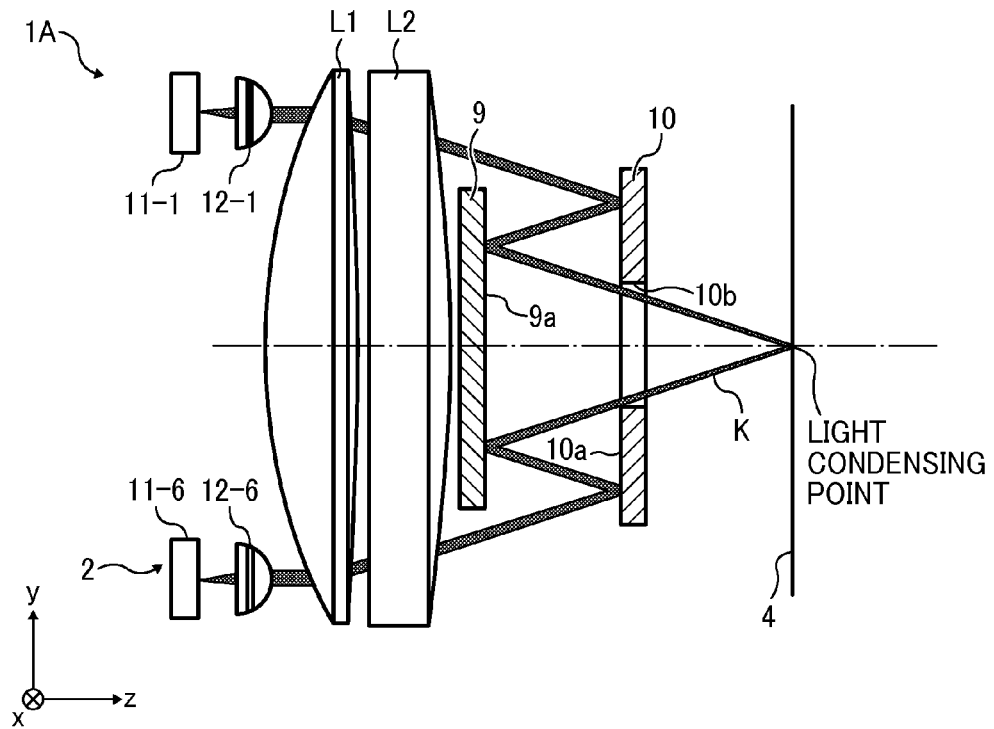
FIG. 4 is a schematic side view of a light source unit according to a second example embodiment.

FIG. 4 is a schematic side view of a light source unit 1A according to a second example embodiment. Different from the first example embodiment, the light condensing optical system of the second example embodiment includes a plurality of condensing lens. Specifically, the light condensing optical system includes a condensing lens L1 and a condensing lens L2 facing the condensing lens L1. In the second example embodiment, the number of light reflection times at each of the first reflection mirror 10 and the second reflection mirror 9 is set to one time.

When the light source unit 1A has two lenses such as the condensing lenses L1 and L2, compared to the first example embodiment, radius of curvature of each one of lenses can be set small compared to the first example embodiment, with which spherical aberration can be suppressed. Therefore, even if positions of light emitting points of the light sources 11-1 to 11-10 and positions of the coupling lenses 12-1 to 12-10 fluctuate due to tolerance, fluctuation of the light focus point can be reduced.

In the second example embodiment, two lenses such as the condensing lenses L1 and L2 are used, but the number of lenses can be three or more. By increasing the number of lenses, spherical aberration can be further suppressed, and therefore, even if positions of light emitting points of the light sources 11-1 to 11-10 and positions of the coupling lenses 12-1 to 12-10 fluctuate due to tolerance, fluctuation of the light focus point can be further suppressed.

Figure 5:
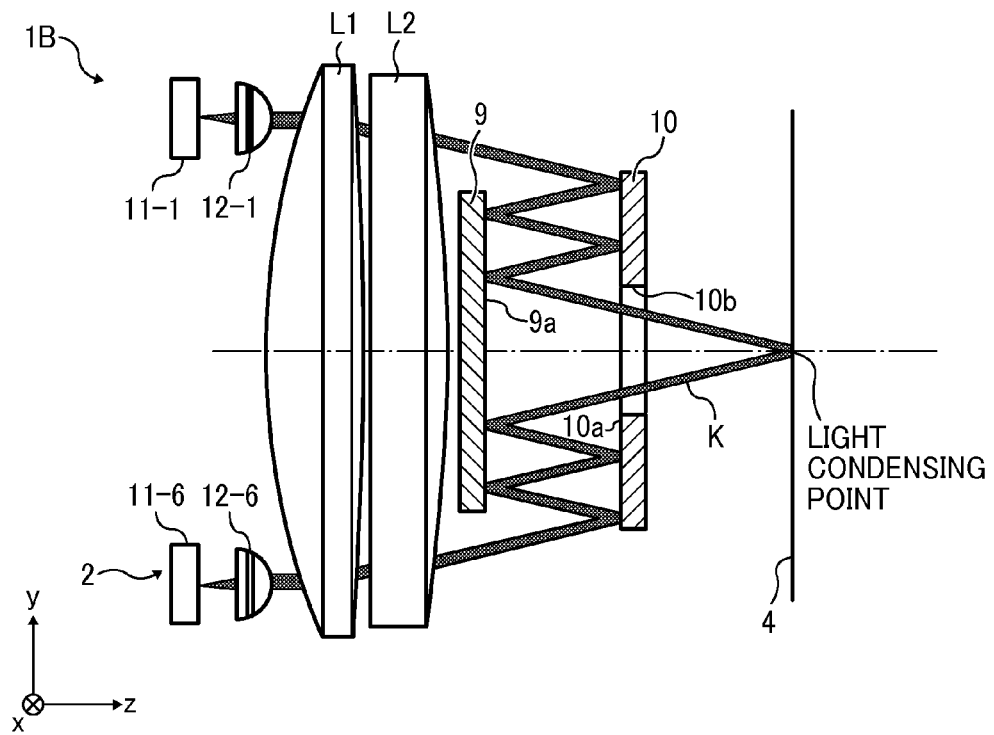
FIG. 5 is a schematic side view of a light source unit according to a third example embodiment.

FIG. 5 is a schematic side view of a light source unit 1B according to a third example embodiment. The light source unit 1B has a light condensing optical system employing a plurality of lenses such as the condensing lenses L1 and L2 which are faced with each other as shown in FIG. 5. In the third example embodiment, the number of light reflection times at each of the first reflection mirror 10 and the second reflection mirror 9 is set to two times.

If the light source unit 1B has the light condensing optical system employing the condensing lenses L1 and L2 and the number of light reflection times between the first reflection mirror 10 and the second reflection mirror 9 is set to a plurality of times, compared to the one-time reflection, the power of the condensing lens L1 required to condense the light beams from the light source assembly 2 to one point can be set smaller. Therefore, spherical aberration can be set small, and even if positions of light emitting points of the light sources 11-1 to 11-10 and positions of the coupling lenses 12-1 to 12-10 fluctuate due to tolerance, fluctuation of the light focus point can be further reduced.

Figure 6:
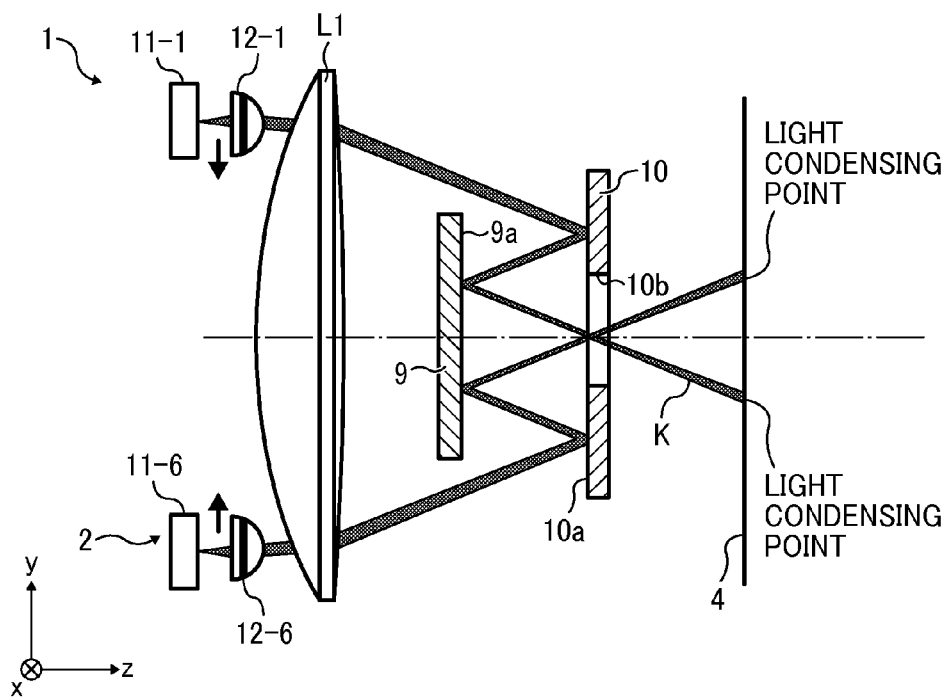
FIG. 6 shows a light path when a coupling lens of a light source of a light source unit of the first example embodiment is shifted.
Figure 7:
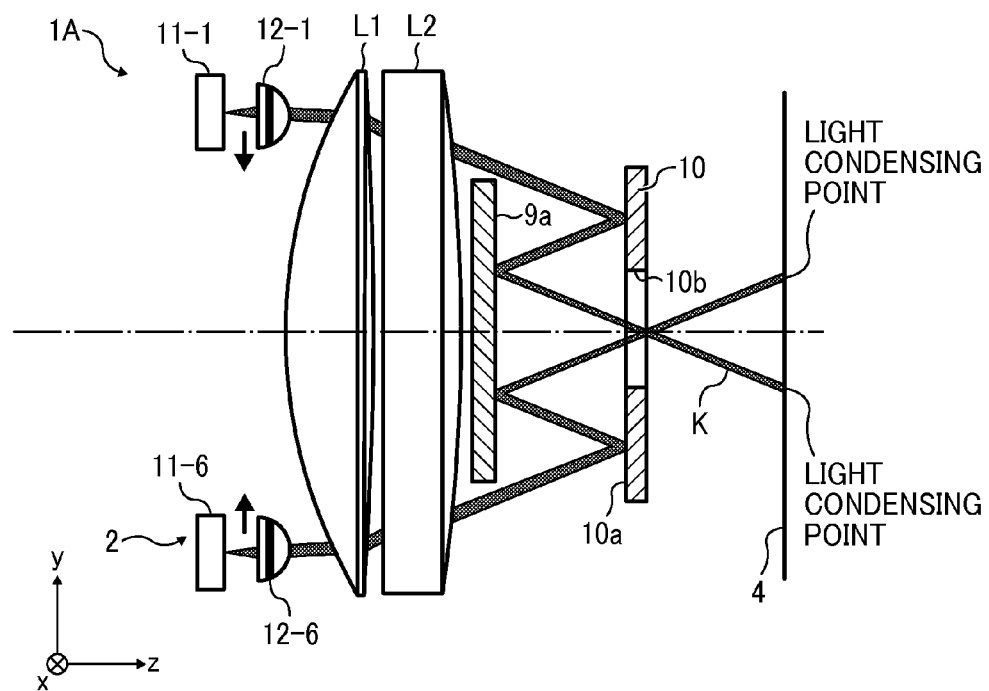
FIG. 7 shows a light path when a coupling lens of a light source of a light source unit of the second example embodiment is shifted.
Figure 8:
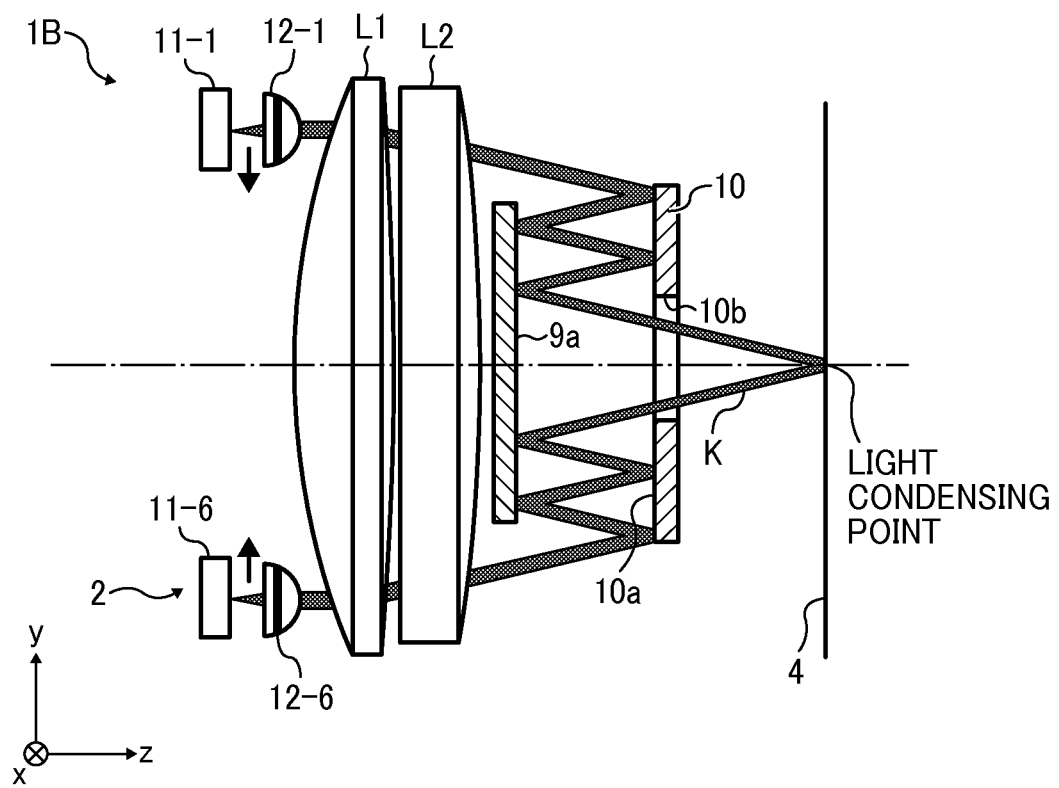
FIG. 8 shows a light path when a coupling lens of a light source of a light source unit of the third example embodiment is shifted.

A description is given of a configuration to suppress fluctuation of the light focus point in the first example embodiment, the second example embodiment and the third example embodiment. FIG. 6 shows a light path when a coupling lens of a light source of the light source unit 1 (FIG. 1) of the first example embodiment is shifted for 0.5 mm toward the inside of the light source unit 1 (synthesizing direction of a plurality of light fluxes). FIG. 7 shows a light path when a coupling lens of a light source of the light source unit 1A (FIG. 4) of the second example embodiment is shifted for 0.5 mm toward the inside of the light source unit 1A (synthesizing direction of a plurality of light fluxes). FIG. 8 shows a light path when a coupling lens of a light source of the light source unit 1B (FIG. 5) of the third example embodiment is shifted for 0.5 mm toward the inside of the light source unit 1B (synthesizing direction of a plurality of light fluxes). These shifts of the coupling lenses assume fluctuation of the coupling lenses.

Figure 9A:
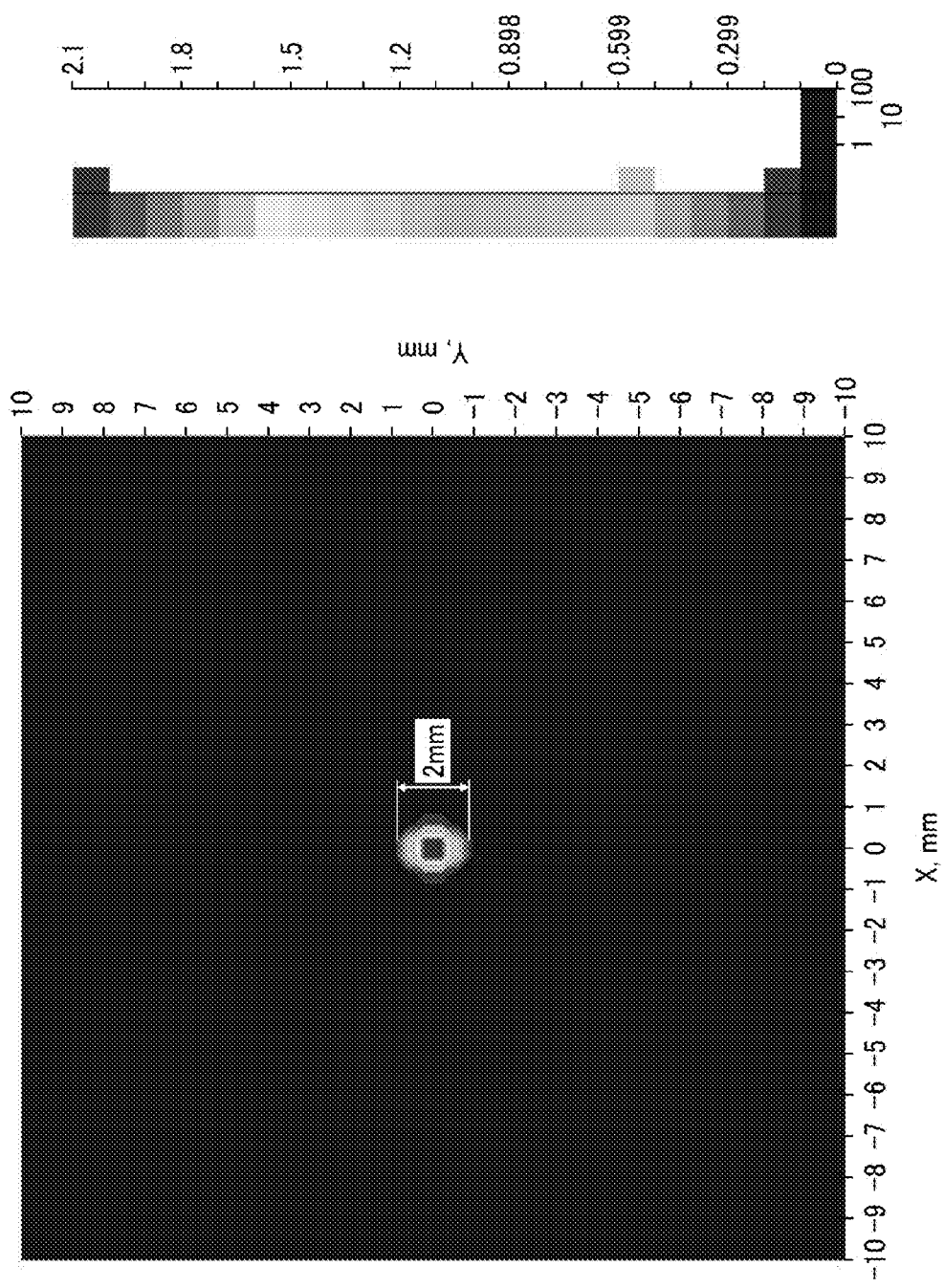
FIG. 9A shows a condition of light focus point for the light source unit of FIG. 1.
Figure 9B:
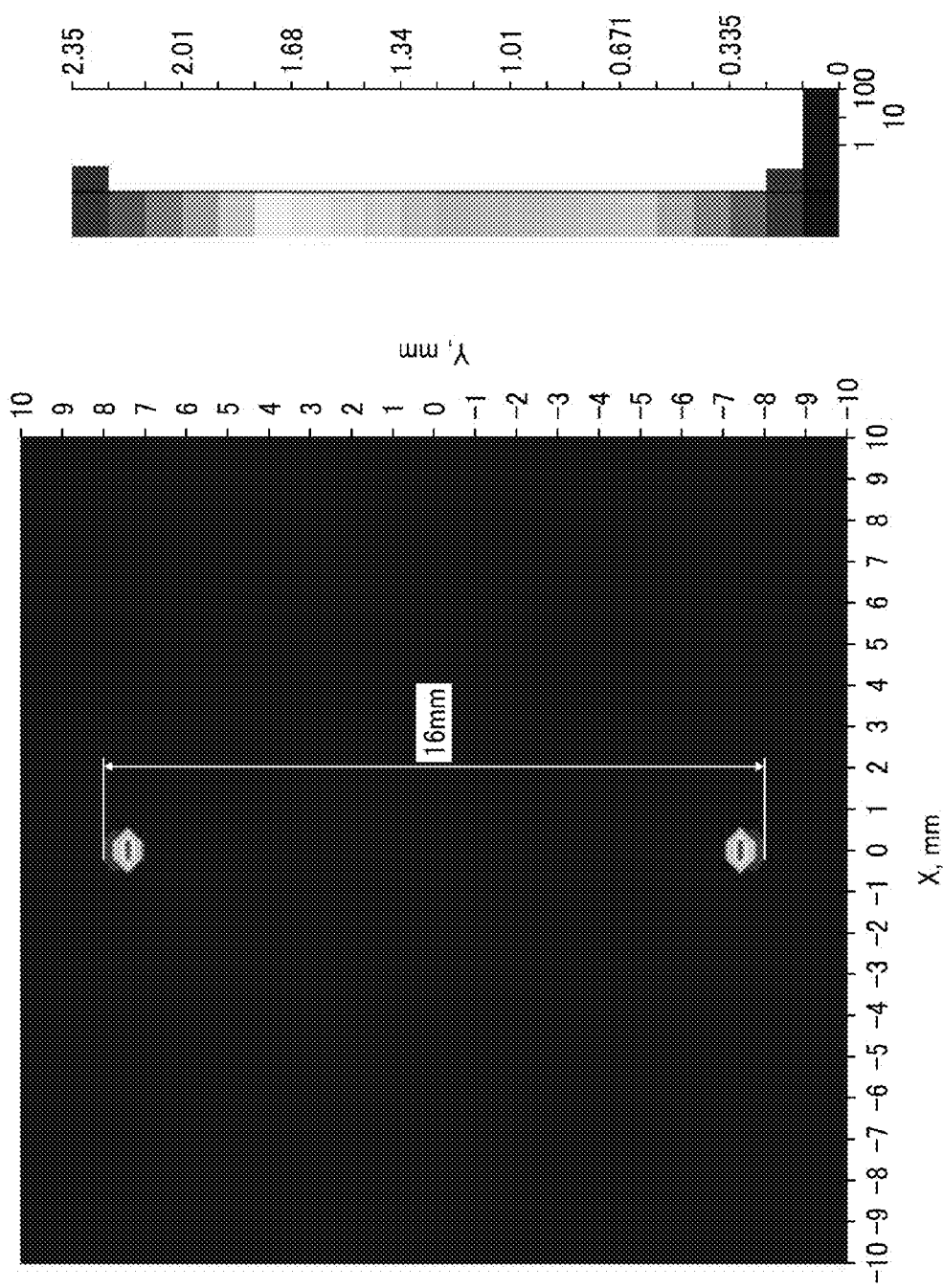
FIG. 9B shows a condition of light focus point for the light source unit of FIG. 6.
Figure 11A:
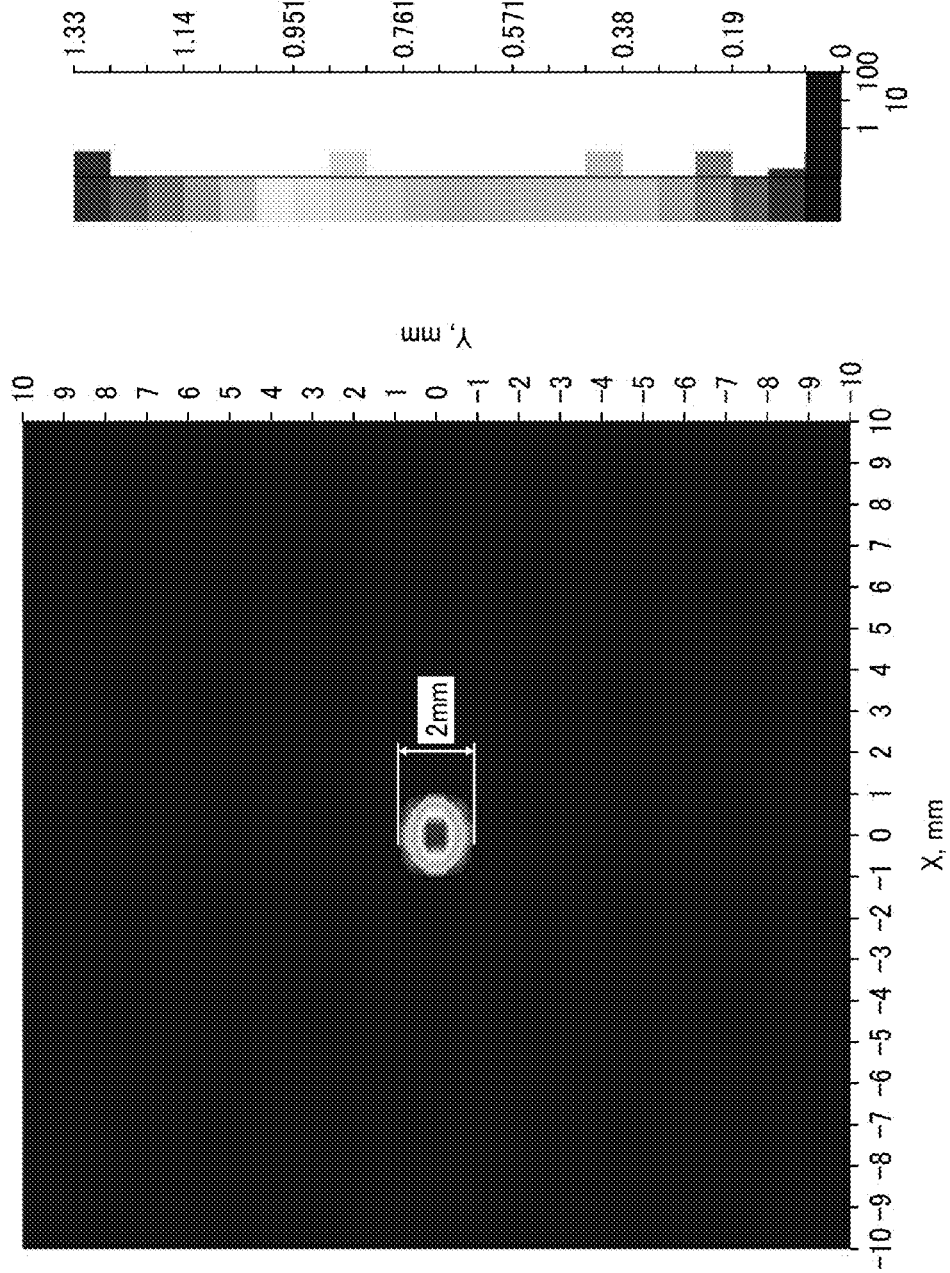
FIG. 11A shows a condition of light focus point for the light source unit of FIG. 5.
Figure 11B:
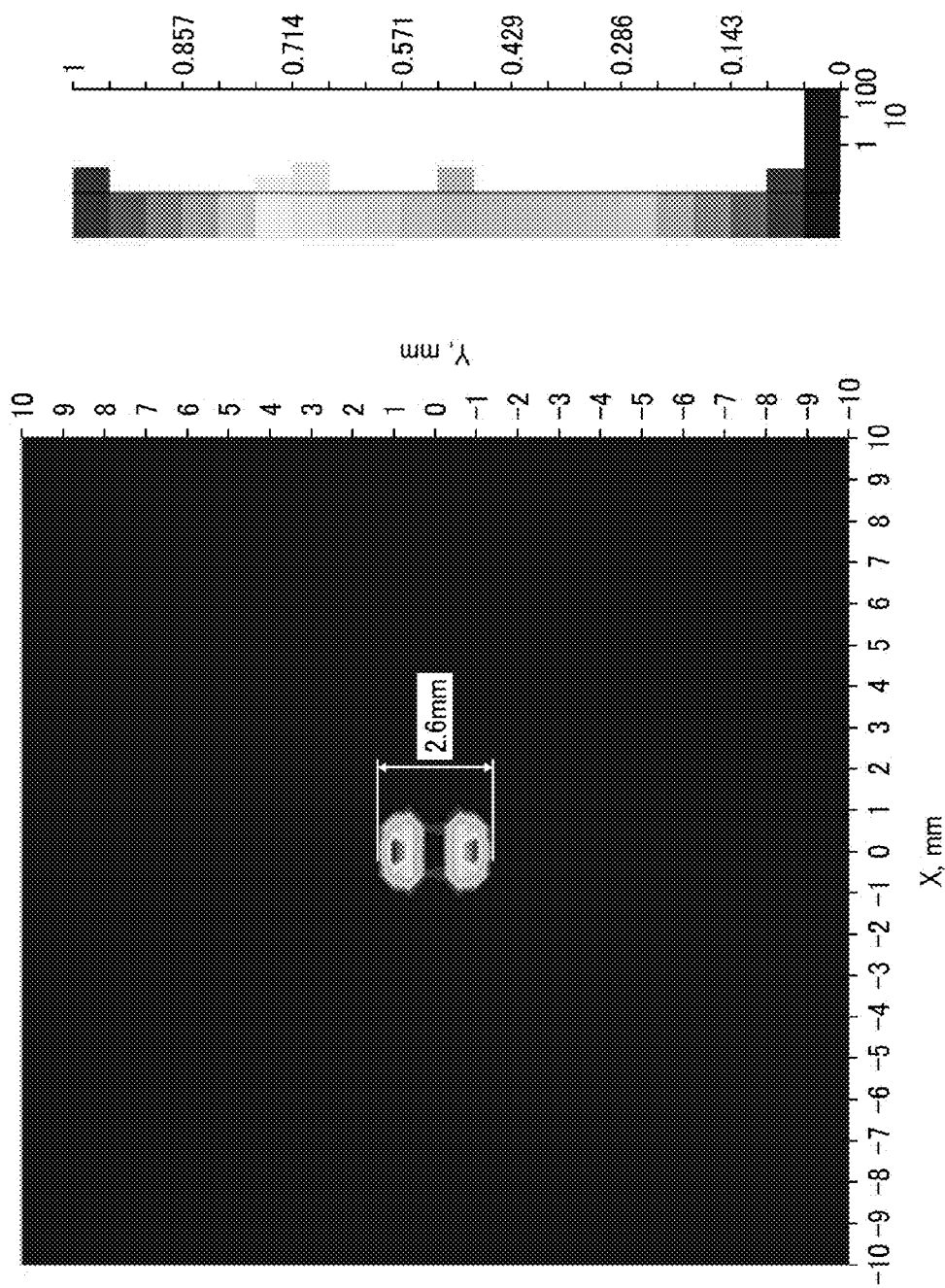
FIG. 11B shows a condition of light focus point for the light source unit of FIG. 8.

FIGS. 9 to 11 show irradiation profiles at the light focus point for the light source unit 1 (first example embodiment), the light source unit 1A (second example embodiment) and the light source unit 1B (third example embodiment) with or without shifting of the coupling lens. FIGS. 9A, 10A, and 11A respectively show irradiation profiles at the light focus point for the light source units shown in FIGS. 3, 4 and 5, in which tolerance of design is not considered. FIGS. 9B, 10B, and 11B respectively show irradiation profiles irradiation profile at the light focus point for the light source units shown in FIGS. 6, 7 and 8 when shifting for 0.5 mm, in which tolerance of design is not considered.

The irradiation profiles shown in FIGS. 9 to 11 are prepared by preparing a mode of each of the light source units on computer program and simulating the irradiation profile on a light condensing face 4 and plotting data. For the simplicity of drawing, FIGS. 9 to 11 show only two light sources and two coupling lenses such as the light sources 11-1 and 11-6, and coupling lens12-1 and 12-6 symmetrically disposed with respect to the x-axis. Further, in cases of FIGS. 9 to 11, a distance from the light sources to the light focus point is set with the same distance.

As shown in FIG. 9A, when there is no shifting (i.e., no deviation) in the first example embodiment, light beams from the plurality of light sources are focused at one point, and the beam diameter is about 2 mm. However, as shown in FIG. 9B, when there is shifting (i.e., deviation), light beams from the plurality of light sources are not focused at one point, in which each of the light focus point positions are deviated with each other, and the light focus point positions have a width of about 16 mm.

As shown in FIG. 10A, when there is no shifting (i.e., no deviation) in the second example embodiment, light beams from the plurality of light sources are focused at one point, and the beam diameter is about 1 mm. However, as shown in FIG. 10B, when there is shifting (i.e., deviation), light beams from the plurality of light sources are not focused at one point, in which each of the light focus point positions are deviated with each other, and the light focus point positions have a width of about 14 mm.

As shown in FIG. 11A, when there is no shifting (i.e., no deviation) in the third example embodiment, light beams from the plurality of light sources are focused at one point, and the beam diameter is about 2 mm. However, as shown in FIG. 11B, when there is shifting (i.e., deviation), light beams from the plurality of light sources are not focused at one point, each of the light focus point positions are deviated with each other, and the light focus point positions have a width of about 2.6 mm.

Based on these irradiation profiles for the light focus point, compared to the first example embodiment using one condensing lens, the second example embodiment using a plurality of condensing lenses can suppress fluctuation of the light focus point because, by using a plurality of condensing lenses such as two, radius of curvature per one condensing lens can be set smaller than radius of curvature of the first example embodiment. Therefore, spherical aberration can be suppressed, and even if positions of light emitting points of the light sources 11-1 to 11-10 and positions of the coupling lenses 12-1 to 12-10 fluctuate due to tolerance, fluctuation of the light focus point can be reduced. With this configuration, the light can be efficiently guided to an optical system after the light focus point, with which a light-transmission optical system having high efficiently can be devised. With this configuration, the light can be efficiently guided to an optical system after the light focus point, with which a light-transmission optical system having high efficiently can be devised.

In the second and third example embodiments, the number of condensing lenses is set two such as the condensing lenses L1 and L2, but the number of condensing lenses can be two or more. With this configuration using a plurality of condensing lenses, spherical aberration of lenses can be further suppressed, and even if positions of light emitting points of the light sources 11-1 to 11-10 and positions of the coupling lenses 12-1 to 12-10 fluctuate due to tolerance, fluctuation of the light focus point can be reduced.

Further, when light profile of light focus point of the second example embodiment shown in FIG. 10 and light profile of light focus point of the third example embodiment shown in FIG. 11 are compared, even if shifting occurs, fluctuation of light focus point of the third example embodiment can be suppressed significantly. This could be devised due to the configuration of the third example embodiment, in which the number of reflection times of light, emitted from the plurality of light sources, at each of the first reflection face of the first reflector 10 and the second reflection face of the second reflector 9 is a plurality of times such as two, with which light emitted from the plurality of light sources can be condensed efficiently.

Therefore, under a condition that a distance from the light sources 11-1 to 11-10 to the light condensing face 4 is a fixed distance, it is preferable to set the number of reflection times of light at each of the first reflector 10 and the second reflector 9 to a greater number.

In the above described each of the light source units, the light reflected by the first reflection mirror 10 and the second reflection mirror 9 exits from the center portion of the first reflection mirror 10 as the light flux K, but the exit position of light such as the opening part 10b used as the light passing portion is not limited to the center portion of the first reflection mirror 10. Further, a position of the second reflection mirror 9 is not limited to the center portion of the supporter 30. The position of the light passing portion and the position of the second reflection mirror 9 can be changed depending on an exit direction and angle.

In the above described each of the light source units, the coupling lenses 12-1 to 12-10 and the light sources 11-1 to 11-10 are co-axially disposed, but the coupling lenses 12-1 to 12-10 can be disposed eccentrically with respect to the optical axis of each of the light sources. With this configuration, the light beams emitted from the light sources become converging light having reduced its cross-section area after exiting the coupling lenses 12-1 to 12-10, and compared to a co-axial configuration, the power of the condensing lens L1 can be set smaller, which is preferable.

In the above described each of the light source units, the light source assembly 2 employs a concentric circular pattern about the optical axis of the condensing lenses L1, and L2, but other arrangement can be used. For example, the light source assembly 2 can employ a semicircular arc pattern, which is one type of concentric circular pattern, or the light source assembly 2 can employ a rectangular pattern. Further, the diameter of the light source assembly 2 is not limited to a diameter shown in drawings. For example, by decreasing the diameter of the light source assembly 2, the size in the x-direction and the y-direction perpendicular to the z-direction of the light source unit (i.e., optical axis direction) can be reduced, with which the light source unit, a lighting apparatus, and an image projection apparatus, to be described later, can be compact in size.

Figure 12:
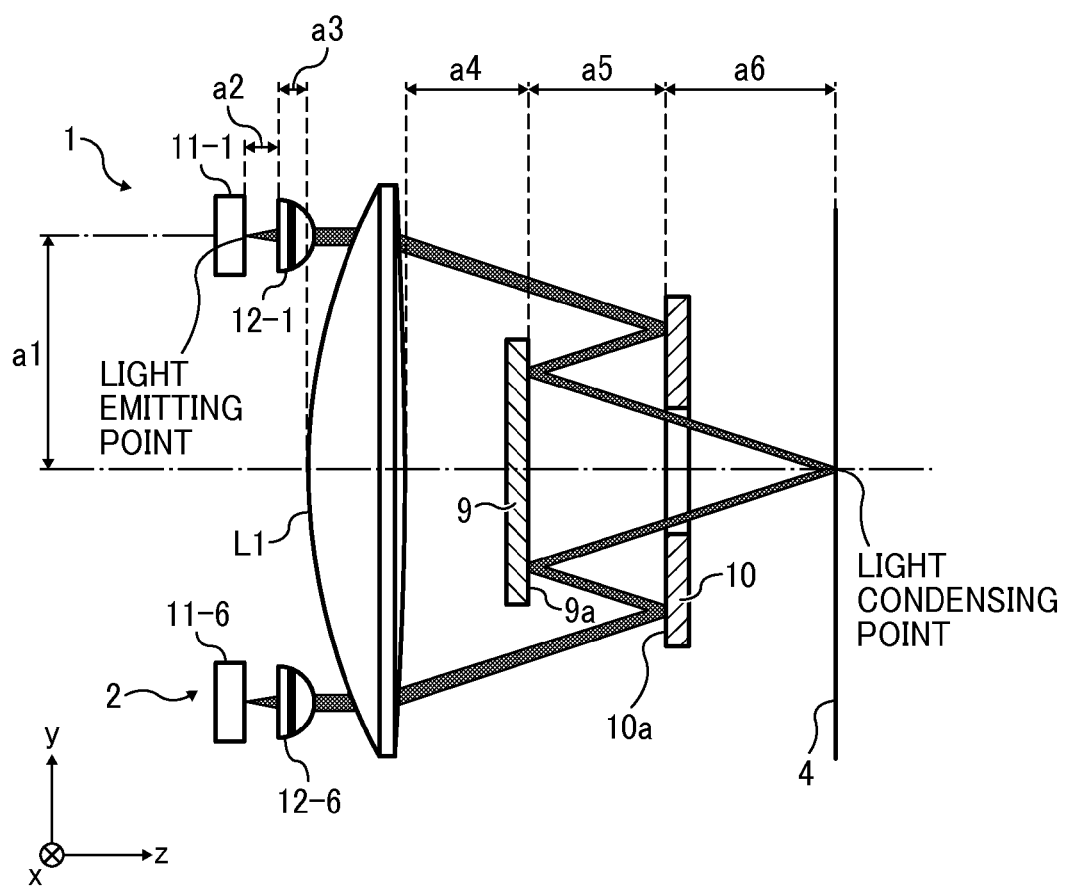
FIG. 12 shows parameters of optical system of the first example embodiment.
Figure 13:
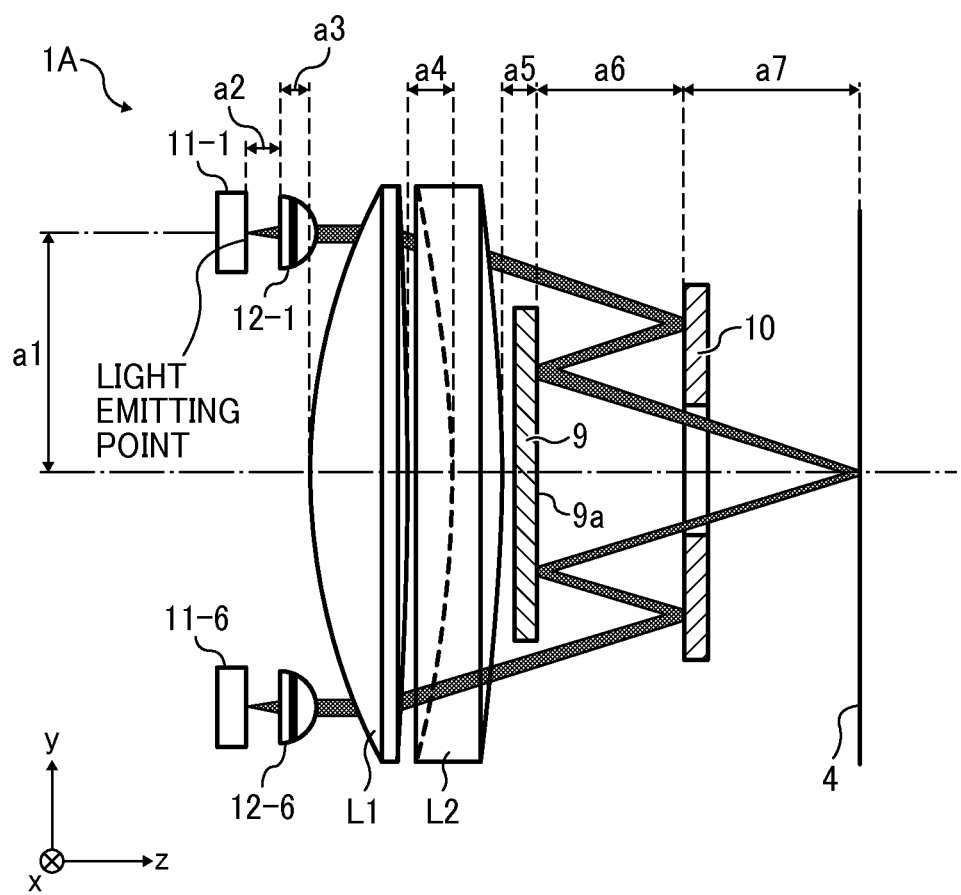
FIG. 13 shows parameters of optical system of the second example embodiment.
Figure 14:
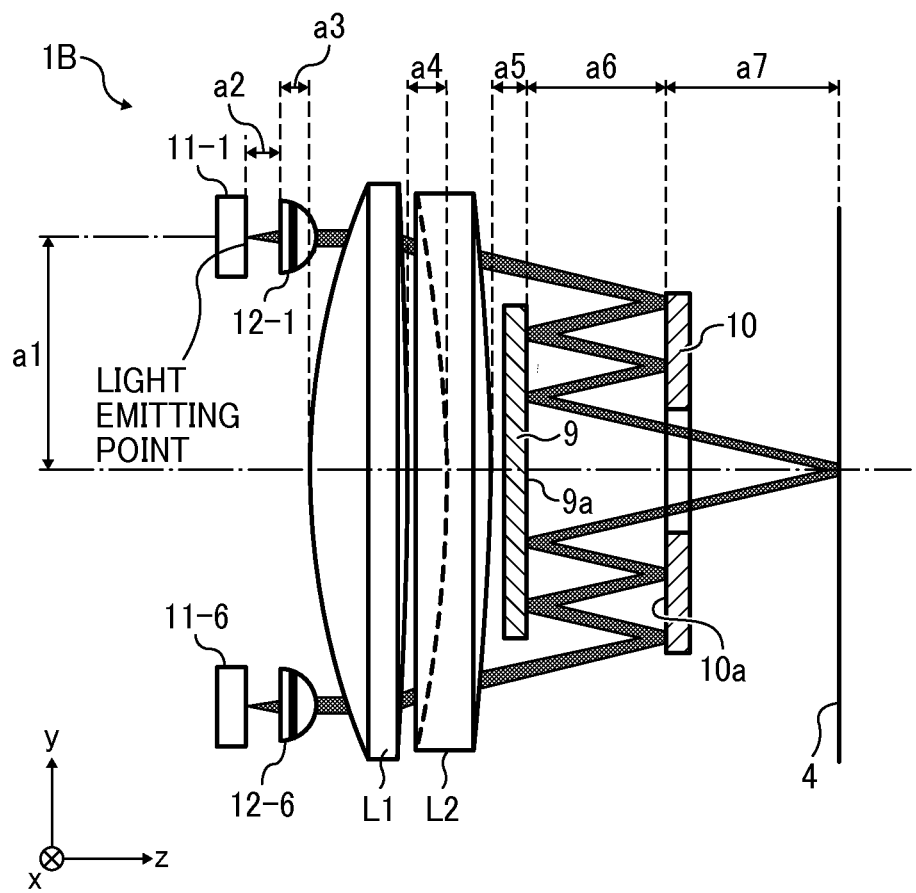
FIG. 14 shows parameters of optical system of the third example embodiment.

A description is given to parameters of optical systems of the first to third example embodiments. Face-to-face distance of each parts in the first to third example embodiments are defined as shown in FIGS. 12, 13, and 14. Further, when a lens is convex to −z direction, the radius of curvature is defined+, and a face of lens at −z side is defined as R1, and an opposite face of R1 is defined as R2. Further, the face-to-face distance between lenses is a distance between the curvature center axis of the lenses.

Because the first example embodiment uses one condensing lens, parameters are put in L1 section. Further, a1 indicates a height in the y-direction from the light focus point to light emitting points of the light sources.

Tables 1 to 6 show face-to-face distance, radius of curvature, thickness, refractive index, and Abbe number for the first to third example embodiments.

TABLE 1

| | face-to-face distance (mm) | | |
|---|---|---|---|
| | $1^{st}$ example embodiment | $2^{nd}$ example embodiment | $3^{rd}$ example embodiment |
| a1 | | 26.00 | |
| a2 | | 4.80 | |
| a3 | | 2.07 | |
| a4 | 14.10 | 4.7 | 4.10 |
| a5 | 15.00 | | 4.00 |
| a6 | 19.00 | | 15.00 |
| a7 | | | 19.00 |

TABLE 2

| | radius of curvature (mm) | | |
|---|---|---|---|
| | $1^{st}$ example embodiment | $2^{nd}$ example embodiment | $3^{rd}$ example embodiment |
| Coupling lens R1 | | 16.99 | |
| Coupling lens R2 | | −4.21 | |
| Condensing lens (L1) R1 | 70.00 | 60.00 | 80.00 |
| Condensing lens (L1) R2 | −459.80 | −400.00 | −459.80 |
| Condensing lens (L2) R1 | | −120.00 | −124.52 |
| Condensing lens (L2) R2 | | −206.88 | −193.91 |

TABLE 3

| | thickness (mm) | | |
|---|---|---|---|
| | 1st example embodiment | 2nd example embodiment | 3rd example embodiment |
| Coupling lens | | 3.00 | |
| Condensing lens (L1) | 10.90 | | 11.5 |
| Condensing lens (L2) | | 5.4 | |

TABLE 4

| | refractive index | | |
|---|---|---|---|
| | 1st example embodiment | 2nd example embodiment | 3rd example embodiment |
| Coupling lens | | 1.52 | |
| Condensing lens (L1) | | 1.68 | |
| Condensing lens (L2) | | | 1.49 |

TABLE 5

| | Abbe number | | |
|---|---|---|---|
| | 1st example embodiment | 2nd example embodiment | 3rd example embodiment |
| Coupling lens | | 63.50 | |
| Condensing lens (L1) | | 55.34 | |
| Condensing lens (L2) | | | 70.24 |

Figure 15:
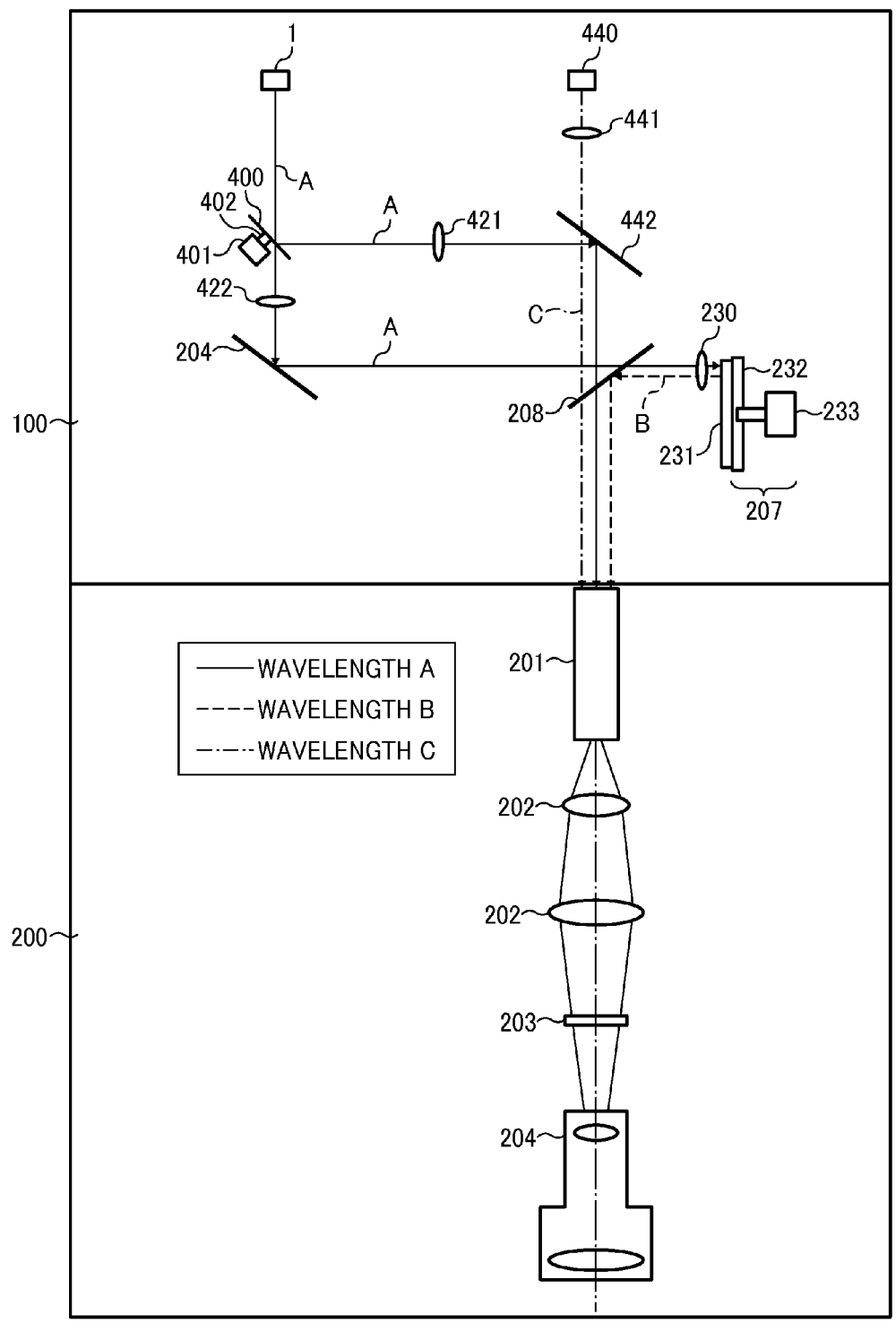
FIG. 15 is a schematic configuration of a lighting apparatus and an image projection apparatus having a light source unit.

A description is given of a lighting apparatus and an image projection apparatus having any one of the above described light source units. FIG. 15 is a schematic configuration of an image projection apparatus such as a projector 200 having a lighting apparatus 100.

The lighting apparatus 100 can use any one of the above described light source units 1, 1A, and 1B of the first to third example embodiments as the light source unit. If any one of the light source units 1, IA, and 1B, which are compact in size is applied, the lighting apparatus 100 and the projector 200 can be compact in size. For example, when the light source unit 1B of the third example embodiment, which reflects the light beams from the light sources between the first reflection mirror 10 and the second reflection mirror 9 for a plurality of times, is used, a size of unit to synthesize light beams can be compact in size in the optical axis direction (z-direction in FIG. 15), and resultantly, the lighting apparatus 100 and the projector 200 can be compact in size.

As shown in FIG. 15, the projector 200 includes, for example, a power source unit 100 having the light source unit 1, a rod integrator 201 used as a light quantity equalizing unit, an image generation panel 203, a relay lens 202 and a projection lens 204. The relay lens 202 is used as a light transmission optical system to transmit light equalized its light intensity by the rod integrator 201 to the image generation panel 203. The projection lens 204 is used as a projection optical system to enlarge and project an image generated by the image generation panel 203.

In a case of FIG. 15, the image generation panel 203 of the projector 200 is a pass-through type panel that generates images based on modulation signals, but other panels such as reflection type panel and a digital micro mirror device (DMD) panel can be used. Further, the rod integrator 201 is an example of the light quantity equalizing unit, and other light quantity equalizing units can be used. Further, the relay lens 202 is one example of the light transmission optical system, and the projection lens 204 is one example of the projection optical system.

In the lighting apparatus 100, the light source unit is used to emit a plurality of color lights, and among the plurality of colors, the light source unit generates and emits at least one color light. Specifically, the lighting apparatus 100 includes, for example, the light source unit 1, coupling lenses 421 and 422, a light source unit 440, a coupling lens 441, a mirror 204, dichroic mirrors 208 and 442, a reflection/passing-through wheel 400 having a passing-through area and a reflection area, and a fluorescent material wheel 207.

The light source unit 1 emits, for example, light having a wavelength A of blue while the light source unit 440 emits, for example, light having a wavelength C of red, which is different from the wavelength A. Further, for example, the dichroic mirror 442 reflects the light having the wavelength A and passes through light having other wavelength, and the dichroic mirror 208 reflects a light having a wavelength B and passes through light having other wavelength.

A description is given of a light path of light having the wavelength A and emitted from the light source unit 1. When the reflection area of the reflection/passing-through wheel 400 is on the light path of the light having the wavelength A, the light enters the reflection/passing-through wheel 400 and is then reflected with a given angle. The light having the wavelength A is reflected and exit from the reflection/passing-through wheel 400, and then passes the coupling lens 421, and is then reflected at the dichroic mirror 442 with a given angle, and passes the dichroic mirror 208, and then enters the rod integrator 201.

When the passing-through area of the reflection/passing-through wheel 400 is on the light path of the light having the wavelength A, the light enters the reflection/passing-through wheel 400 and then passes the reflection/passing-through wheel 400 and then enters the minor 204 via the coupling lens 422. Then, the light is reflected at the mirror 204 with a given angle, and then passes the dichroic mirror 208, and then enters the fluorescent material wheel 207. The light having the wavelength A that has entered the fluorescent material wheel 207 is irradiated to fluorescent material 231 via light condensing element 230.

The fluorescent material 231 is excited by the light having the wavelength A and emits the light having the wavelength B longer than the wavelength A. The light having the wavelength B is reflected by a plate 232, and then enters the dichroic mirror 208 via the light condensing element 230 and is reflected by the dichroic mirror 208 with a given angle, and enters the rod integrator 201. The fluorescent material 231 may be formed on an entire periphery of the fluorescent material wheel 207 as a ring pattern.

Light having the wavelength C emitted from the light source unit 440 enters the dichroic mirror 442 via the coupling lens 441. The light having the wavelength C passes the dichroic mirror 442, and further passes the dichroic mirror 208, and then enters the rod integrator 201. Each light that has entered the rod integrator 201 exits to the relay lens 202, and then irradiated to the image generation panel 203 via the relay lens 202, and is then projected on an external screen using the projection lens 204.

By employing any one of the above described light source units for the projector 200, the light beams emitted from a plurality of light sources can be synthesized as the light beam flux K having high light intensity with reduced cross-section area, and the incidence angle to the rod integrator 201 can be set smaller. Therefore, an area of the light radiating on the image generation panel 203 can be reduced, by which the projection lens 204 having a smaller numerical aperture (NA), which means a greater F-number lens, can be used. Therefore, the projection lens 204 can be designed and manufactured easily, and imaging performance can be maintained at a good enough level easily. The above described image projection apparatus 200 can be compact in size while using a plurality of light sources and equalizing the light intensity.

The above described light source units 1, 1A, and 1B can be applied to the lighting apparatus 100 and other apparatuses. For example, the above described light source units 1, 1A, and 1B can be applied to a lighting apparatus that uses light emitted from the light source unit only as an excitation light to hit fluorescent material, or an image projection apparatus having this lighting apparatus. Further, for example, light emitting diodes (LEDs) can be used as red and blue light, and fluorescent light, which is generated by using excitation light of the above described light source units, can be used as green light.

In the above described example embodiments, the light source unit using the plurality of light sources can be compact in size with an enhanced use efficiency of light from the light sources without increasing the size of the optical system, and the lighting apparatus and the image projection apparatus using the above described light source unit can be compact in size.

In the above described example embodiments, the light beams emitted from each of the plurality of light sources is refracted by the light condensing optical system, and reflected at the reflection faces of the first reflector 10 and the second reflector 9, and a reflection position of second reflector 9 is close to an optical axis of the light condensing optical system such as the condensing lens compared to a reflection position of the first reflector 10. Further, as above described, the light beams emitted from the plurality of light sources reflect for a given number of times, for example, one time or a plurality of times between the plurality of reflection faces of the reflection mirrors, with which a distance for synthesizing light beams emitted from the light sources can be shorter, and the light source unit can be compact in size. Therefore, the image projection apparatus having the above described high efficient and compact light source unit can be compact in size.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light source unit comprising: a first flat reflector having no curvature and including a reflection face; a second flat reflector having no curvature and including a reflection face; a plurality of light sources; and a light condensing optical system to condense light emitted from the plurality of light sources; wherein the first flat reflector is disposed on a light emitting path from the light condensing optical system and the second flat reflector is disposed between the first flat reflector and the light condensing optical system, wherein light beams emitted from the plurality of light sources do not pass through an optical axis portion of the light condensing optical system but pass through a peripheral portion of the light condensing optical system and, wherein the light beams are reflected at a first reflection position on the reflection face of the first reflector, and then reflected at a second reflection position on the reflection face of the second reflector to the optical axis of the light condensing optical system, the second reflection position being relatively closer to an optical axis of the light condensing optical system than the first reflection position, and the light condensing optical system includes a plurality of condensing lenses and the plurality of condensing lenses face each other in a direction parallel to the optical axis.

2. The light source unit of claim 1, wherein the plurality of light sources are disposed radially outside of the first flat reflector when viewed from a light exiting face side, wherein the reflection face of the first flat reflector and the reflection face of the second flat reflector are disposed by facing the reflection face of the first flat reflector and the reflection face of the second flat reflector with each other, and wherein the light beams emitted from the plurality of light sources enter the light condensing optical system, exit to the reflection face of the first flat reflector via the light condensing optical system, are then reflected to the light condensing optical system at the reflection face of the first flat reflector, are then reflected at the reflection face of the second flat reflector to the first flat reflector, and then exit to the first flat reflector.

3. The light source unit of claim 2, wherein a number of reflection times of light, emitted from the plurality of light sources, at each of the reflection face of the first flat reflector and the reflection face of the second flat reflector is one time.

4. The light source unit of claim 2, wherein a number of reflection times of light, emitted from the plurality of light sources, at each of the reflection face of the first flat reflector and the reflection face of the second flat reflector is a plurality of times.

5. The light source unit of claim 2, wherein the plurality of light sources include a plurality of laser elements combined with a plurality of coupling lenses to convert light emitted from the laser elements to parallel light or converging light, each of the respective plurality of laser elements combined with each of the respective plurality of coupling lenses being configured as each of the plurality of respective light sources of a light source assembly.

6. A lighting apparatus for emitting lights of a plurality of colors comprising:
the light source unit of claim 2, wherein the light source unit is configured to generate and emit light of at least one color of the plurality of colors.

7. An image projection apparatus comprising:
the lighting apparatus of claim 6.

8. The light source unit of claim 1, wherein a number of reflection times of light, emitted from the plurality of light sources, at each of the reflection face of the first flat reflector and the reflection face of the second flat reflector is one time.

9. The light source unit of claim 1, wherein a number of reflection times of light, emitted from the plurality of light sources, at each of the reflection face of the first flat reflector and the reflection face of the second flat reflector is a plurality of times.

10. The light source unit of claim 1, wherein the first flat reflector is a plate positioned normal to the optical axis of the light condensing optical system and has a center portion that is able to pass light.

11. The light source unit of claim 1, wherein the plurality of light sources is a plurality of laser elements combined with a plurality of coupling lenses to convert light emitted from the laser elements to parallel light or converging light, each of the respective plurality of laser elements combined with each of the respective plurality of coupling lenses being configured as each of the plurality of respective light sources of a light source assembly.

12. A lighting apparatus for emitting lights of a plurality of colors comprising:
the light source unit of claim 1, wherein the light source unit is configured to generate and emit light of at least one color of colors of the plurality of colors.

13. An image projection apparatus comprising:
the lighting apparatus of claim 12.

14. The light source unit of claim 1, further comprising:
a supporter, disposed around an outer periphery of the plurality of light sources arranged in the circular pattern about an optical axis of at least one of the plurality condensing lenses; and
a retaining part, disposed inside the supporter without blocking a path of light emitted from each of the plurality of light sources, to retain the second flat reflector.

15. A lighting apparatus for emitting lights of a plurality of colors comprising:
the light source unit of claim 14, wherein the light source unit is configured to generate and emit light of at least one color of the plurality of colors.

16. An image projection apparatus comprising:
the lighting apparatus of claim 15.

17. The light source unit of claim 14, wherein the plurality of light sources, the light condensing optical system, the first flat reflector and the second flat reflector are each attached to an inner peripheral edge of the supporter.

* * * * *